United States Patent [19]
DiBiagio et al.

[11] Patent Number: 5,816,639
[45] Date of Patent: Oct. 6, 1998

[54] FLEXIBLE PLUMBING ASSEMBLY

[75] Inventors: Anthony J. DiBiagio, Granger, Ind.; Gordon G. Hastings, Columbus, Ohio; Todd C. Krenelka, Dublin, Ohio; Thomas J. Ward, Hilliard, Ohio

[73] Assignee: Monaco Coach Corporation, Wakarusa, Ind.

[21] Appl. No.: 821,905

[22] Filed: Mar. 21, 1997

Related U.S. Application Data

[63] Continuation of Ser. No. 520,166, Aug. 25, 1995, Pat. No. 5,658,031.

[51] Int. Cl.$^6$ .................................................. B06R 27/00
[52] U.S. Cl. ........................................ 296/26.13; 296/156
[58] Field of Search ........................................ 296/26, 156

[56] References Cited

U.S. PATENT DOCUMENTS

| | | | |
|---|---|---|---|
| 2,193,352 | 3/1940 | Thomas | 296/33 |
| 4,076,272 | 2/1978 | Penton | 280/421 |
| 4,133,571 | 1/1979 | Fillios | 296/23 |
| 4,295,678 | 10/1981 | Morris | 296/156 |
| 4,600,817 | 7/1986 | Hackenberg | 191/12 |
| 4,620,741 | 11/1986 | Hanemaayer | 296/156 |
| 4,654,900 | 4/1987 | McGhee | 4/191 |
| 4,960,299 | 10/1990 | Steadman | 296/26 X |
| 5,090,749 | 2/1992 | Lee | 296/26 X |
| 5,237,782 | 8/1993 | Cooper | 296/26 X |

*Primary Examiner*—Joseph D. Pape
*Attorney, Agent, or Firm*—Leydig, Voit & Mayer, Ltd.

[57] ABSTRACT

A flexible plumbing assembly is provided for use in a trailer with an extensible cabin having rigid plumbing that can be moved between a retracted position wherein the extensible cabin is substantially inside the trailer and an extended position wherein the extensible cabin is substantially outside the trailer. The flexible plumbing assembly comprises a flexible hose connecting the trailer rigid plumbing to the cabin rigid plumbing, a sliding guide for horizontally moving the connection of the flexible hose to the cabin rigid plumbing at a constant elevation relative to the cabin floor as the cabin rigid plumbing moves with the cabin between the extended and retracted positions, and a hose guide for ensuring that material in the flexible hose moves in the proper direction as the cabin moves between the extended and retracted positions. In the preferred embodiment, the sliding guide comprises a support bracket which hold the connection of the flexible hose to the cabin rigid plumbing and is slidably attached to a track that is generally parallel to both the floor and the front and rear walls of the cabin.

12 Claims, 3 Drawing Sheets

FLEXIBLE PLUMBING ASSEMBLY

This is a continuation of application(s) Ser. No. 08/520,166, filed Aug. 25, 1995; now U.S. Pat. No. 5,658,031.

FIELD OF THE INVENTION

This invention generally relates to flexible plumbing assemblies and, more particularly, to flexible plumbing assemblies for use in travel trailers, fifth wheel trailers, motor homes, recreational vehicles and the like provided with extensible room portions for increasing the living space in the trailer.

BACKGROUND OF THE INVENTION

Many travel trailers have a central or main room containing an extensible cabin portion which is laterally extendable in order to increase the interior space of the trailer when the trailer is parked at its final destination. The extensible cabin portion is typically slidably supported upon the floor of the main room for movement between a stored, retracted position and an extended position.

Typically, the kitchen and bathroom areas had to be located in the central room which does not move, in order to accommodate the rigid plumbing necessary for waste disposal lines, water lines, and gas lines. Therefore, generally only the living room section could be extended out from the central room. Unfortunately, separating the kitchen/bathroom from the extensible room prevents the usable area in the central cabin area from being maximized.

Attempts to locate the kitchen and bathroom areas in the extensible cabin portion have been relatively unsuccessful. One solution to locating the kitchen and bathroom areas in the extensible cabin portion is to provide for connection to the utility lines by quick release connectors. The use of quick release connectors, however, necessitates manually connecting and disconnecting the utility lines each time the extensible cabin portion is moved into the extended position. This can lead to an increased likelihood of a poor connection causing leakage. Further, this leakage could lead to safety problems.

OBJECTS AND SUMMARY OF THE INVENTION

It is an object of the invention to provide a vehicle, such as a mobile home, house trailer, recreational vehicle, or the like having a laterally extensible cabin with kitchen and/or bathroom areas that does not require manual connection of plumbing.

It is an object of the invention to provide a flexible plumbing assembly permitting the extensible cabin portion of a trailer, mobile home, recreational vehicle or the like to contain areas needing rigid plumbing such as kitchen and bathroom areas thereby increasing the usable interior space of the main room of the trailer.

It is an object of the invention to provide a flexible plumbing assembly which allows the rigid plumbing in the extensible cabin portion to be used in both the extended and retracted positions.

It is a related object to provide a flexible plumbing assembly that does not require manual disconnection of the rigid plumbing in the trailer from the rigid plumbing in the extensible cabin portion when the cabin is moved from the retracted to the extended positions.

It is a related object to provide a flexible plumbing assembly which allows the rigid plumbing in the extensible cabin to be used when the trailer is moving.

Another object of the present invention is to provide a flexible plumbing assembly that maintains a proper drain slope as the extensible cabin moves between the extended and retracted positions.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
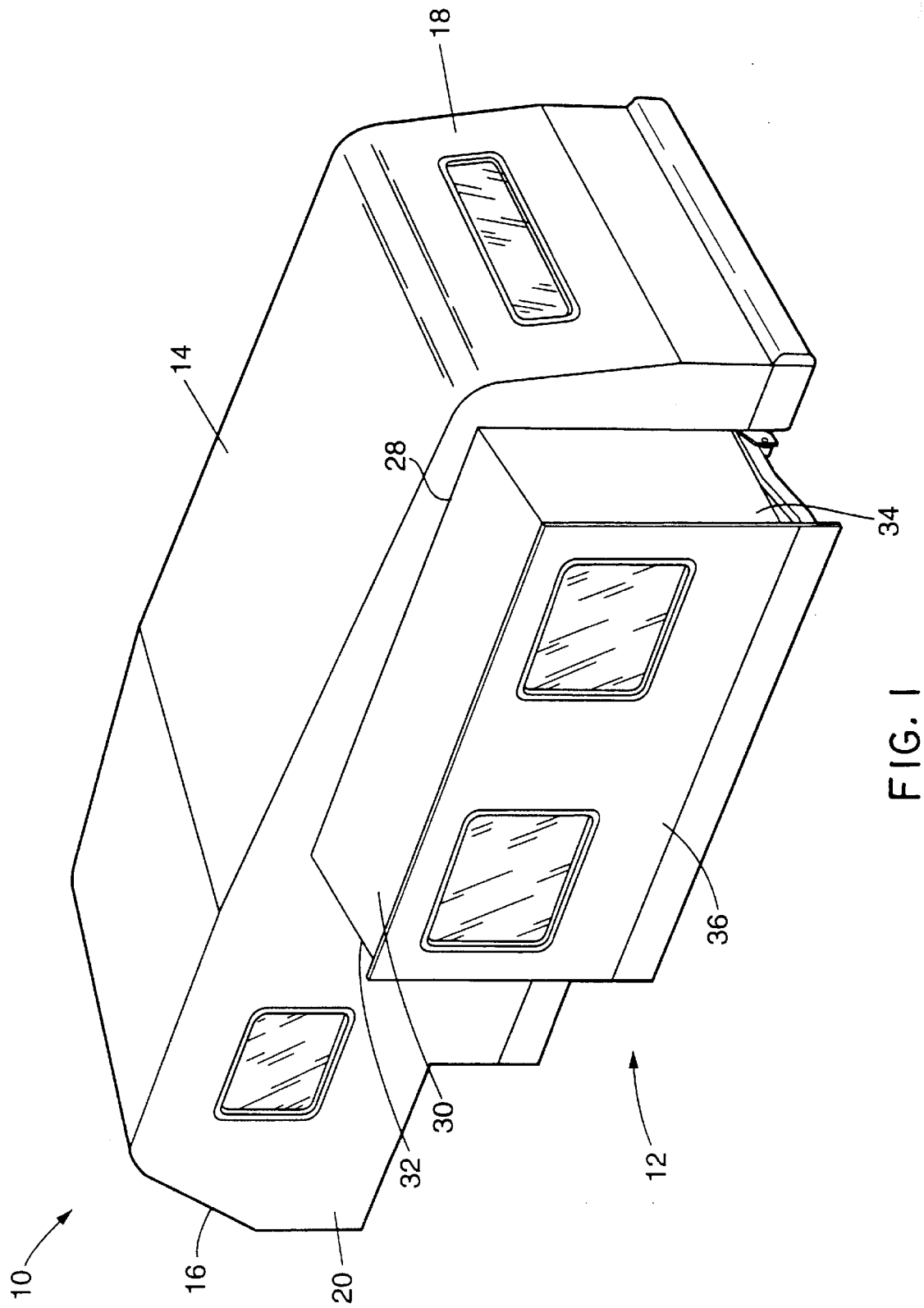
FIG. 1 is a perspective view of a fifth wheel trailer with an extensible cabin in the extended position.
Figure 2:
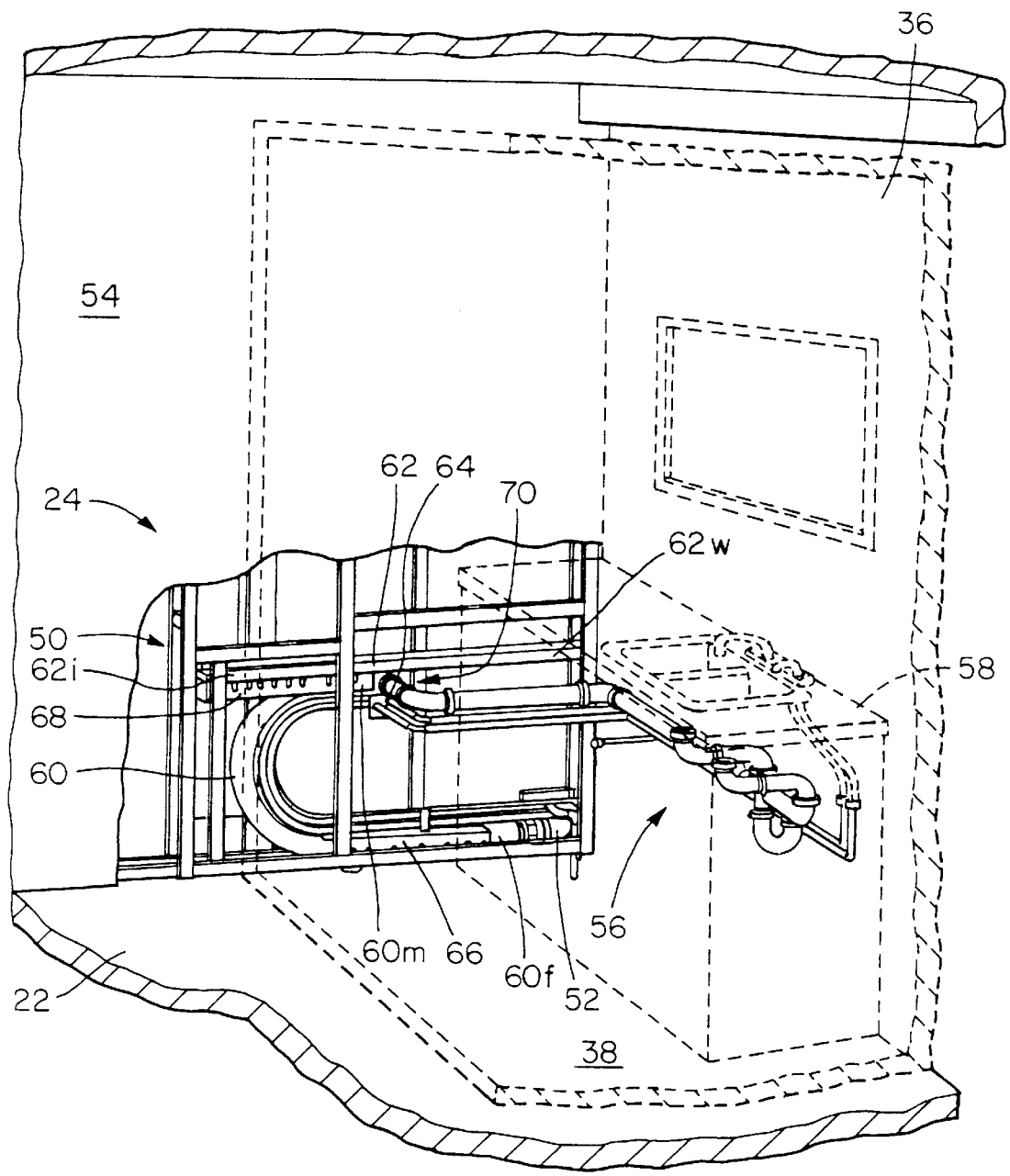
FIG. 2 is a perspective cut away view showing the flexible plumbing assembly disposed within the panel wall in the central room of the trailer and the extensible cabin (in broken lines) in the retracted position.
Figure 3:
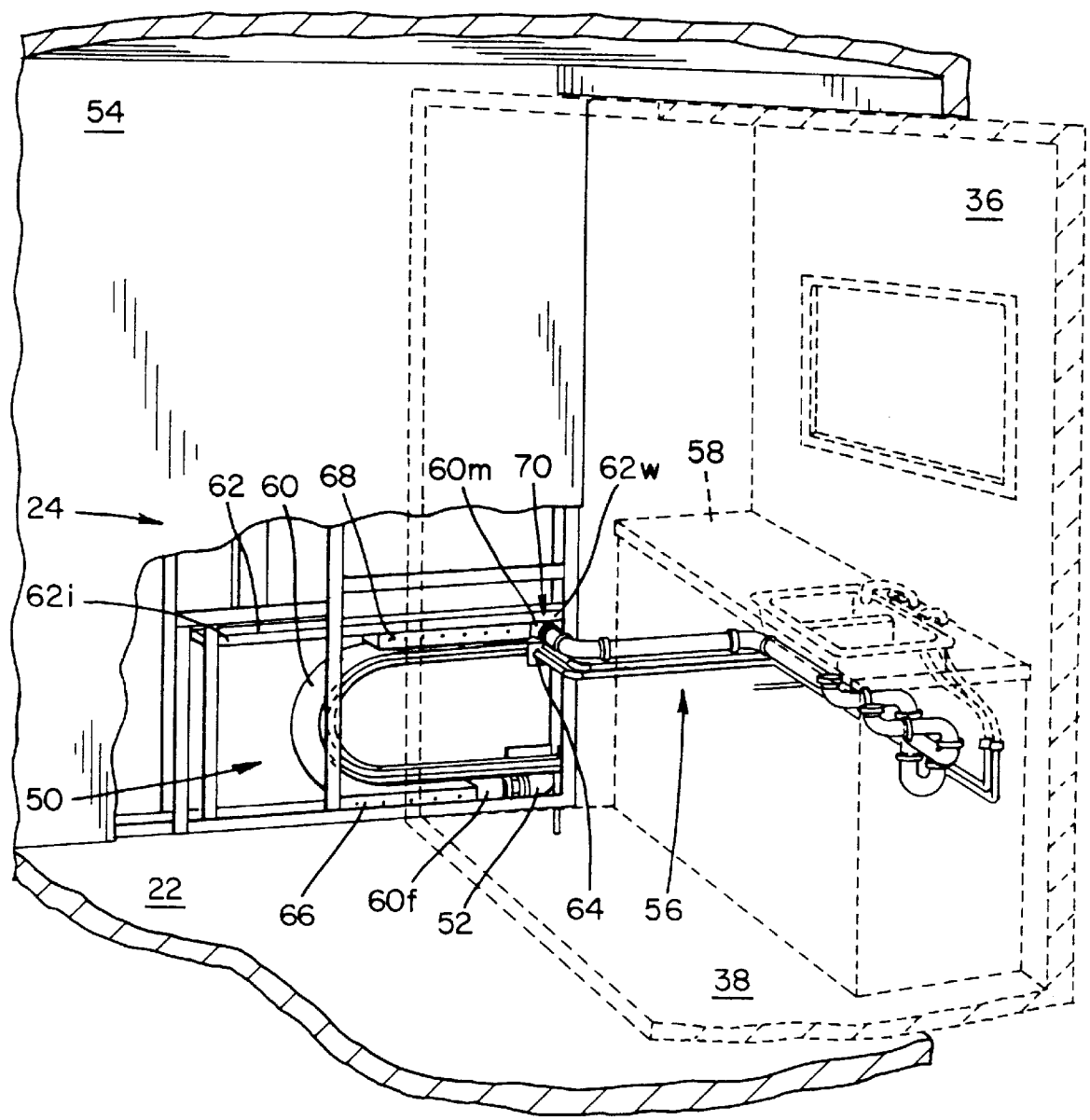
FIG. 3 is perspective cut away view showing the flexible plumbing assembly disposed within the panel wall in the central room of the trailer and the extensible cabin (in broken lines) in the extended position.

Referring to the drawings and particularly to FIGS. 1–3 the trailer 10 has an extensible cabin or room 12 and a slideout mechanism (not shown), and a flexible plumbing assembly 50. Although the illustrated trailer is of the "fifth wheel" type which is adapted to be towed by a vehicle (not shown) disposed at the front end, it will be appreciated that the invention is applicable to any type of expandable vehicle or trailer.

The trailer 10 generally has a ceiling 14, a front wall 16, a rear wall 18, two opposing side walls 20 (only the left wall is shown), and a floor 22 which generally define an interior living space or central room 24. In the illustrated embodiment, the left side wall 20 has an opening 28 for receiving the extensible cabin 12. The extensible cabin 12 has a cabin ceiling 30, a front wall 32, a rear wall 34, side wall 36, and a floor 38.

The extensible cabin 12 is movable between an extended position generally shown in FIG. 1 and in broken lines in FIG. 3 and a retracted position generally shown in broken lines in FIG. 2. In the extended position, the extensible cabin 12 is extended outwardly from the interior trailer space 24 which increases the overall space available inside the trailer 10. In the retracted position, the cabin 12 is positioned inwardly into the interior space 24 of the trailer 10 which decreases the exterior dimensions of the trailer 10 for towing and transport over the highways. The trailer 10 has a slideout mechanism (not shown) for positioning the cabin 12 between the retracted and extended positions. U.S. patent application Ser. No. 08/311,945 dated Sept. 26, 1994, which is incorporated by reference, describes several different slideout mechanisms.

The trailer 10 has a flexible plumbing assembly 50 for maintaining the connection between rigid plumbing in the interior space 24 of the trailer and rigid plumbing in the extensible cabin 12 as the extensible cabin moves between the extended and retracted positions, in accordance with the present invention. The trailer plumbing system may include water or propane supply tanks or storage tanks for waste water and other waste material disposed in the interior space 24 of the trailer. In addition, the plumbing system may include hot and cold water supply lines and drain lines for sinks and a shower, propane supply lines for a gas stove, or drain lines for waste material from a toilet all located in the extensible cabin 12.

As best shown in FIG. 2, the trailer 10 has a plumbing system with rigid plumbing located in both the interior space 24 of the trailer 10 and in the extensible cabin 12 (in broken lines). The interior plumbing 52 is disposed within a panel wall 54 located in the interior space 24 of the trailer 10. The extensible cabin plumbing 56 is contained within a cabinet 58 located along the side wall 36 of the extensible cabin 12. The flexible plumbing assembly 50 connects the interior plumbing 52 to the extensible cabin plumbing 56 enabling material such as water, waste, or gas to be transported several feet horizontally between the interior space and the extensible cabin when the extensible cabin is in the extended position. Although the illustrated extensible cabin plumbing means is a sink with a double wash basin and a gas line for a stove (not shown) along the side wall 36 of the extensible cabin 12, it will be appreciated that the invention is applicable to any type of rigid plumbing that is located within the extensible cabin 12.

The flexible plumbing assembly 50 may comprise a flexible hose, means for horizontally sliding the connection of the flexible hose to the cabin plumbing at the same elevation relative to the floor of the extensible cabin as the extensible cabin moves between the extended and retracted positions, and means for guiding the flexible hose so that the flexible hose maintains a slope sufficient to allow for waste to drain in the proper direction as the extensible cabin moves between the extended and retracted positions.

The flexible hose 60 has a fixed end 60f and a movable end 60m as shown in FIG. 2. In the illustrated embodiment, the fixed end 60f of the flexible hose 60 is attached to the rigid interior plumbing 52. The movable end 60m of the flexible hose 60 is attached to the extensible cabin rigid plumbing 56. The flexible hose 60 is comprised of a flexible material that can bend to accommodate the movement of the extensible cabin 12 between the retracted and extended positions. The flexible hose may be made from any flexible material which will be known to those skilled in the art including, but not limited to, PVC. Further, those skilled in the art will appreciate that the diameter of the flexible hose is dependent upon the size of the trailer and the type of interior plumbing and extensible cabin plumbing the flexible hose is being used to connect. The flexible hose can have a diameter that ranges anywhere from ¼ inch to 6 inches. In addition, the flexible hose 60 must be of length sufficient to reach the extensible cabin rigid plumbing 56 when the extensible cabin 12 is in the extended position. It will be appreciated that the flexible hose 60 can be used to connect rigid propane, hot and cold water supply, drainage, and sewage plumbing in the interior space 24 to like plumbing in the extensible cabin 12.

The sliding means comprises a track 62 and a support bracket 64, as depicted in FIG. 2. As illustrated the track 62 and the support bracket 64 are disposed in the hollow interior of the panel wall 54 that is positioned in the interior space 24 so that it is generally parallel to the extensible cabin 12 front wall 32 and rear wall 34. Further, the track 62 is disposed so that it runs generally parallel to both extensible cabin floor 38 and the front and rear walls 32 and 34 of the extensible cabin 12. For ease of reference, the track 62 has an interior end referenced as 62i and an outboard or wall end referenced as 62w, as shown in FIGS. 2 and 3. The track 62 is adapted to receive the support bracket 64.

The support bracket 64 is adapted to receive and support the connection 70 between the flexible hose movable end 60m and the extensible cabin rigid plumbing 56. In order to accommodate the horizontal movement of the extensible cabin rigid plumbing 56 relative to the interior space rigid plumbing 52, the support bracket 64 is slidably connected to the underside of the track 62. The support bracket 64 is disposed at the track interior end 62i when the extensible cabin 12 is in the retracted position, as shown in FIG. 2. As the extensible cabin 12 is moved towards the extended position, the support bracket 64 travels horizontally along the track 62 towards the outboard or wall end 62w of the track in unison with the extensible cabin 12. In addition, the support bracket 64 is maintained at a constant level above the extensible cabin floor 38 in order to accommodate the fixed elevation of the extensible cabin rigid plumbing 56 relative to the extensible cabin floor 38. Thus, when the extensible cabin 12 is in the fully extended position, the support bracket 64 is at the outboard or wall end 62w of the track and the flexible hose 60 has bent to accommodate the movement from the retracted to the extended positions, as shown in FIG. 3. In this manner the connection between the movable end of the flexible hose 60m and the extensible cabin plumbing 56 moves along both in unison with the extensible cabin 12 and at a constant level above the extensible cabin floor 38 as the extensible cabin 12 causes the extensible cabin plumbing 56 to move horizontally between the extended and retracted positions.

The flexible hose guiding means comprises a fixed hose guide 66 and a movable hose guide 68. The fixed hose guide 66 is disposed along the bottom of the panel wall 54 where the flexible hose runs generally parallel to the trailer floor 22. The movable hose guide 68 is disposed on the underside of the track 62 where the flexible hose also runs generally parallel to the trailer floor 22. Further, the movable hose guide 68 is both rigidly attached to the support bracket 64 and slidably attached to the track 62. Thus, as the extensible cabin 12 moves between the retracted and extended positions, the movable hose guide 68 moves in unison with the support bracket 64 towards the outboard or wall end 62w of the track. In order to ensure that material in the flexible hose drains in the proper direction in the areas where it tends to run horizontally, the hose guiding means can be adjusted to provide any predetermined slope in the flexible hose that is necessary to insure proper drainage or to meet any applicable regulations. In the preferred embodiment, both the fixed hose guide 66 and the movable hose guide 68 are adapted to hold the flexible hose 60 so that a one quarter inch per foot slope is maintained in the areas where the flexible hose tends to run horizontally.

Thus, it will be seen that a novel and improved flexible plumbing assembly for use in slideout trailers has been provided which attains the aforementioned objects. Various additional modifications of the embodiment specifically illustrated and described herein will be apparent to those skilled in the art, particularly in light of the teachings of this invention.

We claim as our invention:

1. A flexible plumbing assembly for use in a recreational vehicle having a fixed cabin with a fixed rigid plumbing means, and an extensible cabin that is moveable between a retracted position and an extended position relative to the fixed cabin, the extensible cabin having a movable rigid plumbing means, said flexible plumbing assembly comprising:

a flexible hose having a fixed end connected to the fixed rigid plumbing means and an opposite movable end connected to the movable rigid plumbing means; and sliding means for moving the movable end at a constant elevation relative to the fixed end as the extensible cabin rigid plumbing moves with the extensible cabin between the extended and retracted positions.

2. The flexible plumbing assembly as set forth in claim 1 wherein said sliding means includes a support bracket secured to move with said extensible cabin and a track secured to said fixed cabin, wherein the support bracket holds said moveable end of said flexible hose and is slidably attached to the track.

3. The flexible plumbing assembly as set forth in claim 2 wherein said track is disposed generally horizontally.

4. The flexible plumbing assembly as set forth in claim 1, further comprising hose guiding means holding at least a portion of the flexible hose at a desired drainage angle as the extensible cabin moves between the extended and retracted positions.

5. The flexible plumbing assembly as set forth in claim 4 wherein said hose guiding means includes a fixed hose guide channel disposed near said fixed end of the flexible hose, and a movable hose guide channel secured to move with said support bracket near said movable end of said flexible hose, wherein portions of the hose lie respectively in the fixed hose guide channel and the movable hose guide channel at desired drain angles.

6. The flexible plumbing assembly as set forth in claim 5, wherein said guide channels hold said hose in a generally U-shaped bend between said guide channels.

7. The flexible plumbing assembly as set forth in claim 1, wherein said flexible hose connects rigid drain plumbing in said extensible cabin to rigid drain plumbing in said fixed cabin.

8. The flexible plumbing assembly as set forth in claim 1, wherein said flexible hose connects rigid propane plumbing in said extensible cabin to rigid propane plumbing in said fixed central cabin.

9. The flexible plumbing assembly as set forth in claim 1, wherein said flexible hose connects rigid sewage plumbing in said extensible cabin to rigid sewage plumbing in said fixed cabin.

10. The flexible plumbing assembly as set forth in claim 1, wherein said flexible hose connects rigid hot and cold water supply plumbing in said extensible cabin to rigid hot and cold water supply plumbing in said fixed cabin.

11. A plumbing assembly for use in a recreational vehicle having a fixed cabin and an extensible cabin which is movably mounted to the fixed cabin, the fixed cabin including fixed rigid plumbing mounted thereto and the extensible cabin including movable rigid pluming mounted thereto, the plumbing assembly comprising:

a flexible hose having a fixed end connected to the fixed rigid plumbing and a movable end connected to the movable rigid plumbing;

a generally straight fixed guide channel mounted to the fixed cabin and receiving at least a portion of the flexible hose near the first end; and a generally straight moveable guide channel mounted move with to the extensible cabin and receiving a portion of the flexible hose near the second end, the guide channels being generally facing each other and holding the flexible hose generally in a U-shape.

12. The plumbing assembly according to claim 11, wherein each of the guide channels holds the respective portion of the flexible hose at an angle to promote drainage through flexible hose.

\* \* \* \* \*